United States Patent [19]

Kawai

[11] Patent Number: 4,555,127
[45] Date of Patent: Nov. 26, 1985

[54] PASSIVE SEAT BELT SYSTEM
[75] Inventor: Osamu Kawai, Fujisawa, Japan
[73] Assignee: NSK-Warner K.K., Japan
[21] Appl. No.: 584,318
[22] Filed: Feb. 28, 1984
[30] Foreign Application Priority Data Mar. 17, 1983 [JP] Japan ............................. 58-38838[U]

[51] Int. Cl.⁴ ............................................ B60R 21/10
[52] U.S. Cl. ..................................... 280/806; 280/804
[58] Field of Search ............... 280/802, 804, 806, 808; 297/469, 479, 480

[56] References Cited

U.S. PATENT DOCUMENTS

| 4,223,915 | 9/1980 | Tanaka et al. | 280/804 |
| 4,290,629 | 9/1981 | Ueda et al. | 280/806 |
| 4,324,419 | 4/1982 | Ueda | 280/804 |

FOREIGN PATENT DOCUMENTS 55-28549  2/1980  Japan .

Primary Examiner—Joseph F. Peters, Jr.
Assistant Examiner—Ross Weaver
Attorney, Agent, or Firm—Cantor and Lessler

[57] ABSTRACT

Disclosed herein is a passive seat belt system suitable for use in a vehicle such as passenger car. It is constructed of a guide rail, a runner movable along the guide rail so as to guide a webbing between an occupant-restraining position and an occupant-releasing position, a force-transmitting member connected with the runner and driven along the length of the guide rail by drive means, an inertia-sensing member movable in response to changes in speed of the vehicle, and a pawl operable by the inertia-sensing member in the event of an emergency of the vehicle so that the pawl is brought into engagement with the force-transmitting member to restrain any further movement of the runner along the guide rail. It is thus possible to make a free selection as to the installation positions of the pawl and inertia-sensing member, thereby bringing about such an advantageous effect that the freedom has been increased in laying out a seat belt system.

12 Claims, 13 Drawing Figures

PASSIVE SEAT BELT SYSTEM

BACKGROUND OF THE INVENTION (1) Field of the Invention

This invention relates to a passive seat belt system suitable for use in a vehicle such as passenger car or the like.

(2) Description of the Prior Art

Pertaining to the so-called passive seat belt systems in each of which the webbing is automatically guided between the occupant-restraining position and occupant-releasing position in accordance with the getting-on and getting-off of an occupant, there have been proposed in recent years a variety of systems which have been improved in operation, reliability, etc. Many of such systems are each equipped with a guide rail provided on a vehicle body and a runner movable along the guide rail so as to guide one end or an intermediate portion of the webbing, whereby guiding the webbing to the occupant-restraining position or occupant-releasing position owing to a movement of the runner.

Other proposals have also been made on locking devices which are each adapted to lock its respective runner on a fixing member secured on a vehicle body so that the restraint of the occupant is ensured in the case of an emergency such as vehicle collision, overturn or the like.

Since most of conventionally-proposed locking devices are however of such type that a runner is locked directly, such locking devices are imposed by a serious limitation that their installation positions must be adjacent to the positions of their corresponding runners which have brought their respective webbings to the occupant-restraining positions thereof. When using especially an emergency locking device as a locking device, it is necessary to have at least one inertia-sensing member adapted to detect a variation in speed of a vehicle and a locking member operable by the inertia-sensing member. It is thus desired to permit free selection of its installation position, because such a locking device is accompanied by a difficulty in view of its installation space and a possible danger of producing vibratory noises near the occupant's head and of giving unpleasant feeling to him if such members have to be provided in an upper part of the center pillar or adjacent to the roof side.

SUMMARY OF THE INVENTION

The present invention has been completed principally with the aforementioned circumstances in view.

An object of this invention is therefore to provide a passive seat belt system which permits to choose the installation positions of an inertia-sensing member and locking device, which are adapted to restrain any further movement of a runner along a guide rail in the case of an emergency of a vehicle, at desired positions.

In one aspect of this invention, there is thus provided a passive seat belt system comprising:

a guide rail provided on the body of a vehicle;

a runner movable along the guide rail so as to guide a webbing between an occupant-restraining position and an occupant-releasing position;

a force-transmitting member connected with the runner and driven along the length of the guide rail by drive means;

an inertia-sensing member movable in response to changes in speed of the vehicle; and a pawl operable by the inertia-sensing member in the case of an emergency of the vehicle so that the pawl is brought into engagement with the force-transmitting member to restrain any further movement of the runner along the guide rail.

In another aspect of this invention, the passive seat belt system may further comprise a locking device adapted to releasably lock the runner which has guided the webbing to the occupant-restraining position.

In a further aspect of this invention, the passive seat belt system may additionally comprise a locking device adapted to releasably hold the runner which has guided the webbing to the occupant-restraining position and means for releasing the runner from the locking device in response to a movement of the force-transmitting member so that the webbing is guided to the occupant-releasing position.

In the passive seat belt system of this invention, the force-transmitting member and pawl are brought into mutual engagement in the case of an emergency of the vehicle so that the runner is restrained from any further movement. Accordingly, it is possible to make a free selection as to the installation positions of the pawl and the inertia-sensing member movable in response to changes in speed of the vehicle, thereby bringing about such an advantageous effect that the freedom has been increased in laying out a seat belt system.

The above and other objects, features and advantages of the present invention will become apparent from the following description and the appended claims, taken in conjucntion with the accompanying drawings.

DETAILED DESCRIPTION OF THE INVENTION AND PREFERRED EMBODIMENTS

Figure 1:
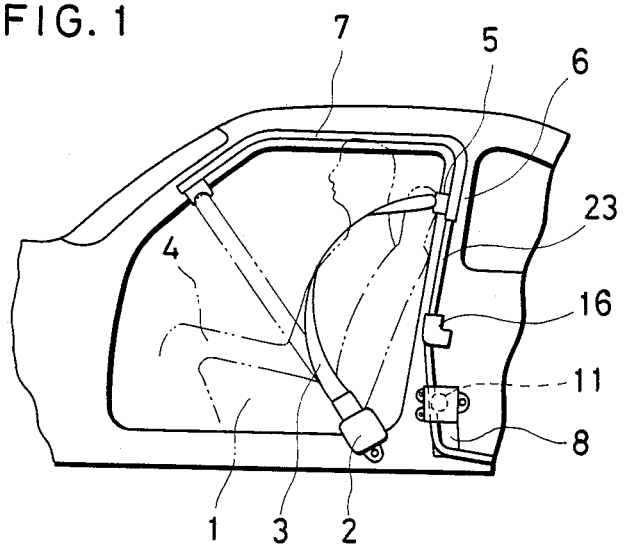
FIG. 1 is a schematic illustration of a passive seat belt system according to the first embodiment of this invention.
Figure 2A:
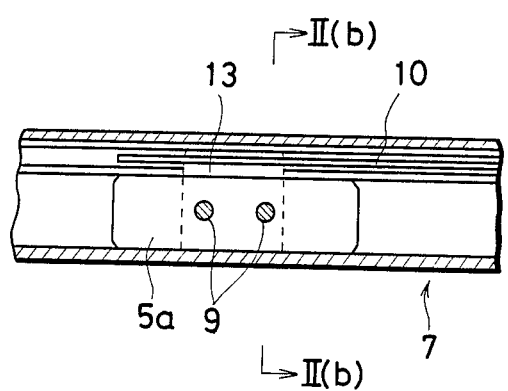
FIG. 2(a) is a fragmentary cross-sectional view of the passive seat belt system shown in FIG. 1.
Figure 2B:
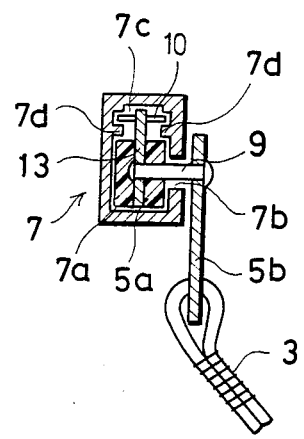
FIG. 2(b) is a cross-sectional view taken along line II(b)—II(b) of FIG. 2(a)

In FIG. 1, the passive seat belt system according to the first embodiment is applied to the front right seat of a passenger car. In other words, the viewer is seeing the front right seat from the interior of the passenger car. A conventional retractor 2 is fixedly secured in the rear bottom corner on the inner side wall of a seat 1. A webbing 3 extends upwardly, crossing diagonally in front of an occupant 4. A runner 5, which is attached to the upper end portion of the webbing 3, is slidably held in a guide rail 7 provided along the roof of the passenger car and in the front-to-rear direction of the passenger car and having a rear end portion extended along a center pillar 6 to an area adjacent to the back of the seat 1. As depicted in FIGS. 2(a) and 2(b), a sliding portion 5a of the runner 5 is slidably received in a guide cavity 7a formed in a middle-to-lower part of the guide rail 7. The webbing 3 is connected to the sliding portion 5a by way of a plate 5b and pins 9 which extend through a slot 7b.

Figure 3A:
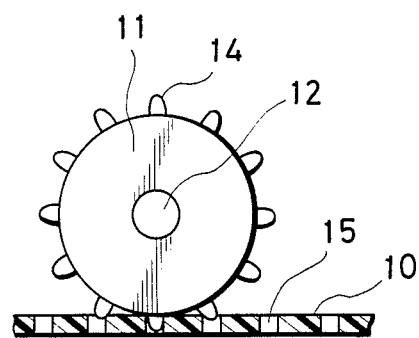
FIGS. 3(a) and 3(b) illustrate the manner of meshing engagement between drive mean and a force-transmitting member.
Figure 3B:
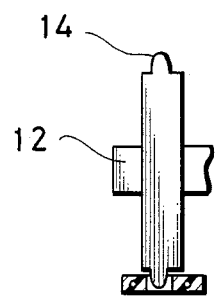

On the other hand, the runner 5 and a force-transmitting member 10 are coupled together by a connecting member 13. Thus, the runner is moved in the guide rail 7 by causing the force-transmitting member 10 [see, FIGS. 2(a) and 2(b)] to move along the lengthwise direction thereof by means of a motor 8 and gear 11 which make up drive means. As depicted in detail in FIGS. 3(a) and 3(b), the gear 11 is fixedly mounted on an output shaft 12 of the motor 8 so that cogs 14 of the gear 11 are brought into meshing engagement with windows 15 formed through the force-transmitting member which is preferably made of a synthetic resin (for example, a polyester).

Figure 4A:
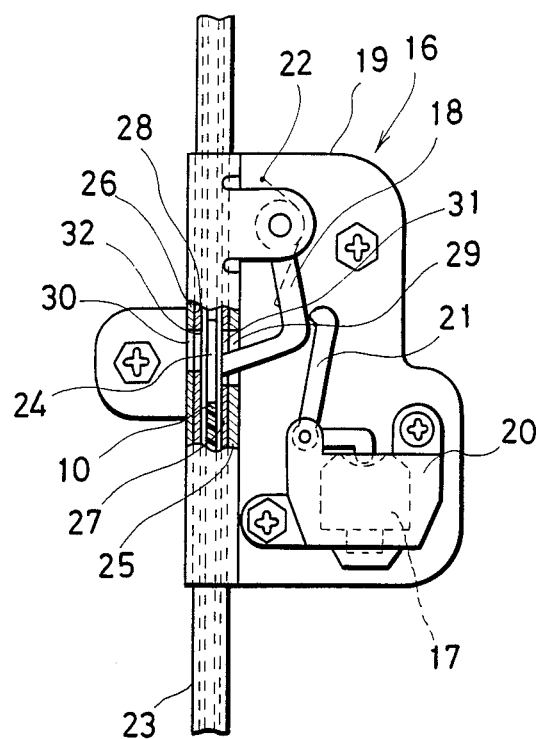
FIG. 4(a) is an enlarged, fragmentary, partly cross-sectional view of the passive seat belt system, seen in the same direction as in FIG. 1.
Figure 4B:
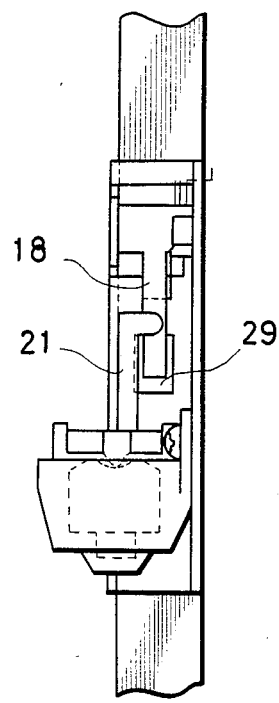
FIG. 4(b) is a side view of the same part of the passive seat belt system as that depicted in FIG. 4(a)

Between a rear bottom portion of the guide rail 7 and the motor 8, there is provided an emergency locking device 16 illustrated in detail in FIGS. 4(a) and 4(b). FIG. 4(a) is an enlarged view of the locking device 16 and its vicinity parts and FIG. 4(b) is a side view thereof. The emergency locking device 16 is constructed principally of an inertia-sensing member 17 movable in response to changes in speed (which has a direction and a magnitude) of the passenger car and a pawl 18 operable by the inertia-sensing member 17 and made preferably of a metal. The inertia-sensing member 17 is received in a casing 20 attached to a bracket 19 in such a way that the inertia-sensing member 17 can assume either a static position depicted in FIGS. 4(a) and 4(b) or an inclined position. The inertia-sensing member 17 is brought to the latter position when the speed of the passenger car has changed beyond a predetermined level. On the top of the inertia-sensing member 17, there is mounted one end of an arm 21 supported turnably on the casing 20. The other end of the arm is kept in abutment with the pawl 18 supported turnably on the bracket 19. When the inertia-sensing member 17 has inclined, the arm 21 is turned counterclockwise and the pawl 18 is then turned clockwise against the biasing force of a return spring 22 to render the pawl 18 engageable with the force-transmitting member 10. By the way, the return spring 22 is provided to normally urge the pawl 18 toward a position where the pawl 18 is unable to engage with the force-transmitting member 10. The above urging force also acts in such a way that the inertia-sensing member 17 is normally held at the static position, thereby maintaining the pawl 18 unoperable by small vibrations of the passenger car which vibrations are lower in magnitude than the above-mentioned predetermined level. In FIG. 4(a), numeral 23 indicates a guide for guiding the force-transmitting member 10. Incidentally, no problem or inconvenience would occur even if the inertia-sensing member is replaced from that depicted in FIGS. 4(a) and 4(b) to another inertia-sensing member such as a pendulum-shaped or ball-shaped inertia-sensing member.

Figure 5:
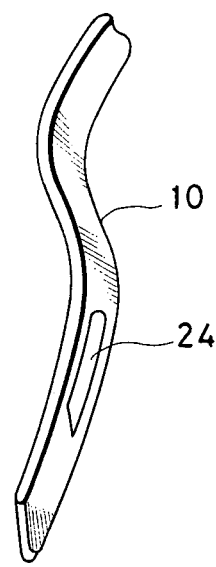
FIG. 5 is a fragmentary perspective view of a force-transmitting member.

FIG. 5 is a perspective view of a part of the force-transmitting member 10 which part is illustrated in FIG. 4(a). Through the widthwise central portion of the force-transmitting member which has been formed into a tape-like configuration, there is formed an engagement window 24 which is brought into engagement with the pawl 18.

The force-transmitting member 10 is guided along a prescribed path, owing to the provision of the guide cavity 7c of the guide rail 7 and the guide 23. When the webbing 3 assumes the occupant-restraining position as illustrated by solid lines in FIG. 1, the above-mentioned windows 15 [see, FIGS. 3(a) and 3(b)] are formed through at least part of the force-transmitting member 10 which part extends from a point, where the force-transmitting member 10 is kept in meshing engagement with the gear 11 fixedly connected with the motor 8, to the free rear end portion of the force-transmitting member 10. In this case, the aforementioned emgagement window 24 is formed through the force-transmitting member 10 at a position which corresponds to another position where the pawl 18 of the emergency locking device 16 is provided.

When producing the force-transmitting member 10, it may be possible to form windows through its entire lengthwise area because separate formation of the windows 15 and engagement window 24 is time-consuming work. In this case, one of the resulting windows serves also as an engagement window so that the particular window is brought into engagement with the pawl.

Operation of the thus-constructed passive seat belt system, which pertains to the first embodiment of this invention, will hereinafter be described.

When the occupant 4 opens the door (not illustrated) in order to get on or off the passenger car, the motor 8 rotates in a prescribed direction and moves the force-transmitting member 10 forwards (i.e., leftwards as seen in FIG. 1) in its entirety owing to successive meshing engagement between the gear 11 and the windows 15 formed through the force-transmitting member 10. At the same time, the runner 5 is also moved in the same direction along the rail 7. Upon completion of the forward movement of the runner 5, the webbing 3 assumes the occupant-releasing position indicated by two-dot chain lines in FIG. 1 and permits the occupant to get on or off the passenger car.

At this time, the force-transmitting member 10 undergoes a smooth movement while being guided at both longitudinal edges thereof by the guide 23 and a pair of guide ribs 7d,7d extending into the guide cavity 7c of the guide rail 7. In addition, the runner 5 coupled with the force-transmitting member 10 by means of the connecting member 13 is received in a guide cavity 7a without any substantial clearance therebetween. Accordingly, the runner 5 is allowed to move smoothly without developing any substantial unsoundness. Incidentally, the runner 5 is formed of a sliding portion 5a, plate 5b, pins 9 and connecting member 13.

When the occupant 4 sits in the seat 1 and closes the door, the motor 8 rotates in a direction opposite to that mentioned above to cause the force-transmitting member 10 to move rearwardly and then downwardly along the center pillar, thereby allowing the webbing 3 to restrain the occupant 4 over his lap area and right shoulder.

In each of the above situations, the pawl 18 is held at the position, where the pawl is unable to engage with the force-transmitting member 10, by the return spring 22 as illustrated in FIG. 4. Thus, the force-transmitting member 10 is allowed to move freely and the runner 5 coupled with the force-transmitting member 10 is also allowed to undergo free movement in the guide rail 7.

Upon a collision of the passenger car, the occupant tends to move forwards owing to an inertia force. However, the runner is restrained from any further forward movement and the occupant can be safely protected, since the rear end portion of the guide rail 7 is provided in the top-to-bottom direction of the passenger car and along the center pillar 6. At this time, the runner 5 is also restrained from moving upwards as will be described below.

Upon an overturn of the passenger car, the runner is liable to move toward the roof. However, the runner 5 can be restrained from undergoing such a movement when the movement of the force-transmitting member 10 is stopped. Namely, the inertia-sensing member 17 is tilted when it detects a speed change of the passenger car. The inertia-sensing member 17 then causes, by way of the arm 21, the pawl 18 to turn against the biasing force of the return spring 22 to a position where the pawl 18 is brought into engagement with the force-transmitting member 10. Accordingly, the force-transmitting member 10 is restrained from any further lengthwise movement, thereby restraining any further movement of the runner 5 coupled with the force-transmitting member 10. Here, the pawl 18 is kept extending through the engagement window 24 formed in the force-transmitting member 10. Therefore, the pawl 18 is supported by the upper endges of holes 29,30, 31,32 which are formed respectively through right and left guide walls 25,26 of the bracket 19 and right and left walls 27,28 of the guide 23, whereby to restrain any further movement of the force-transmitting member 10 without failure.

Since the force applied to the runner 5 when the passenger car overturns, in other words, the weight of the occupant is about 200 kg at the heaviest, the occupant can be satisfactorily supported by the force-transmitting member 10. In addition, the runner 5 is twisted when the webbing 3 is pulled obliquely relative to the guide rail 7, because the force-transmitting member 10 is restrained from any further movement. Thus, the runner 5 is pressed firmly against the guide rail 7 or another member mounted on the body of the passenger car, thereby restraining the occupant more completely.

The second to fifth embodiments of this invention will hereinafter be described with reference to FIGS. 6 through 10 of the drawings, in which like reference numerals identify like elements of structure in FIGS. 1 through 5. Furthermore, description will be omitted on the same elements of structure as those employed in the first embodiment illustrated in FIGS. 1 to 5.

Figure 6:
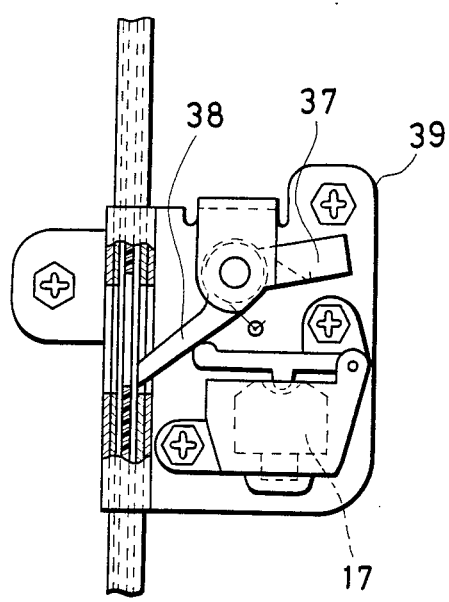
FIG. 6 is an enlarged, fragmentary, partly cross-sectional view of a passive seat belt system according to the second embodiment of this invention.

Description will next be made with reference to FIG. 6, which illustrates the second embodiment of this invention in which the shape of the pawl has been changed. In the second embodiment, a pawl 38 has a counterweight portion 37 and is supported rotatably on a bracket 39 with its center of gravity serving as the center of its turning motions. Even if the pawl 38 is made of a metal, the pawl may thus be operated instantaneously in response to the motion of the inertia-sensing member 17 without being substantially and adversely affected by the direction of each inertia force.

Figure 7:
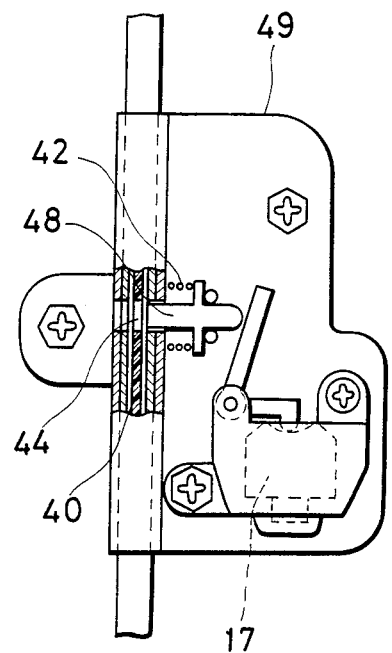
FIG. 7 is an enlarged, fragmentary, partly cross-sectional view of a passive seat belt system according to the third embodiment of this invention.

Next, the third embodiment in which the pawl has also been modified in shape will be described with reference to FIG. 7. A pawl 48 is slidably supported on a bracket 49. In the case of an emergency, the pawl 48 is caused to slide leftwards by the sensing member 17 against the biasing force of a coil spring 42 and is brought into engagement with an engagement window 44 formed through a force-transmitting member 40.

Since the pawl 48 is slidable in the above embodiment, the engagement window 44 formed through the force-transmitting member 40 may be large enough if it is slightly larger than the cross-sectional vertical area of the pawl 48. Thus, the force-transmitting member 40 has almost no play after it has been brought into engagement with the pawl 48, thereby restraining the movement of the runner 5 in a shorter period of time.

Figure 8:
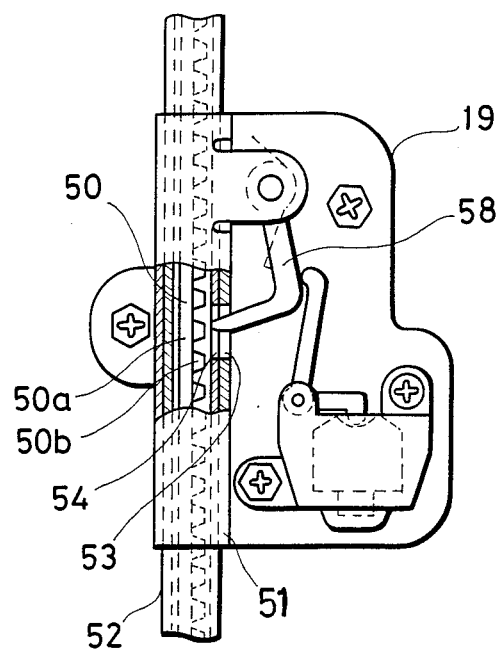
FIG. 8 is an enlarged, fragmentary, partly cross-sectional view of a passive seat belt system according to the fourth embodiment of this invention.

With reference to FIG. 8, will be described the fourth embodiment of this invention in which the force-transmitting member has a modified configuration. In this embodiment, a force-transmitting member 50 has a tape-like main body 50a and a number of teeth 50b formed spacedly on one surface of the main body 50a and having a bilaterally and symmetrically trapezoidal configuration when seen in a side view. Reflecting the modification to the shape of the force-transmitting member, the cogs of a gear which cogs are brought into meshing engagement with the teeth 50b have a shape somewhat modified from that of the first embodiment although these cogs are not shown in FIG. 8.

In the event of an emergency of the passenger car, the pawl 58 is turned clockwise and is brought into engagement with one of the teeth 50b. Accordingly, the force-transmitting member 50 is restrained from moving lengthwise and the runner is thus restrained from any further movement. In this embodiment, the pawl 58 is supported by that particular teeth 50b and the upper edges of holes 53,54 formed respectively through a right guide wall of the bracket and the right wall of the guide 52 when the pawl 58 has been brought into engagement with the teeth 50b.

Figure 9:
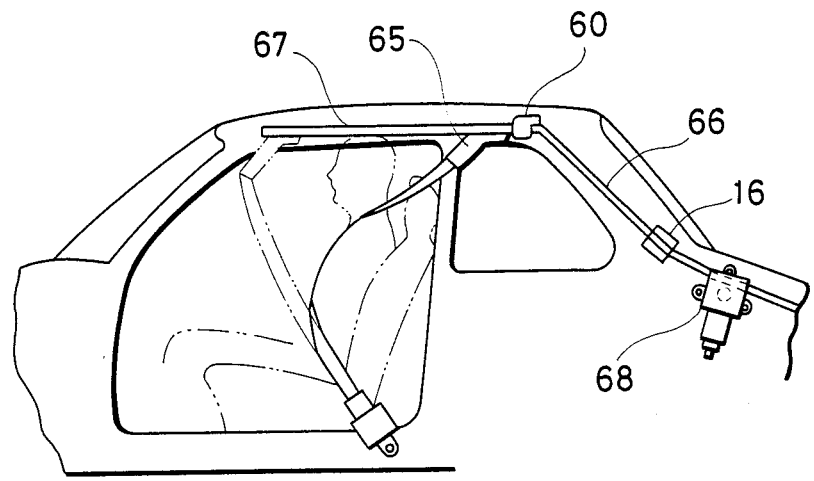
FIG. 9 is a schematic illustration of a passive seat belt system according to the fifth embodiment of this invention.
Figure 10:
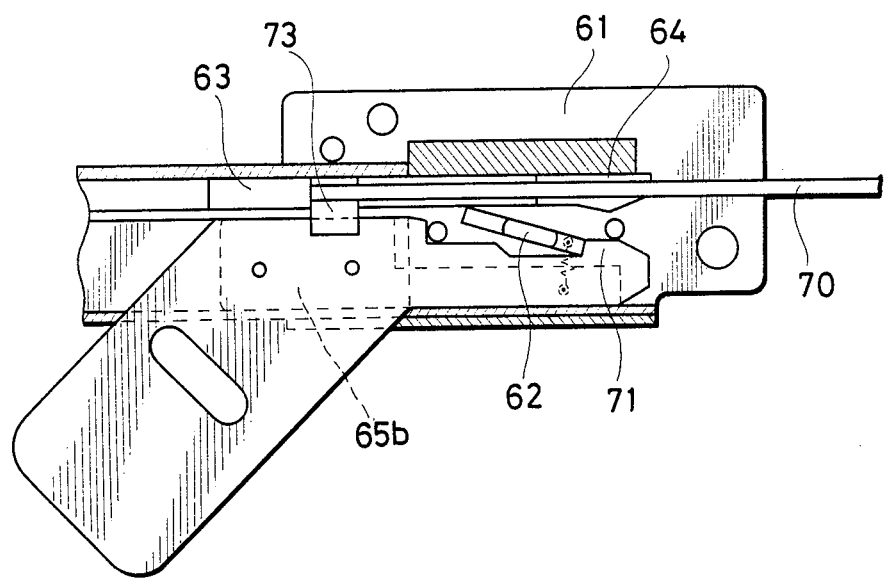
FIG. 10 is an enlarged, fragmentary, partly cross-sectional view of the passive seat belt system of FIG. 9.

Reference is next to be made to FIGS. 9 and 10, which illustrate the fifth embodiment of this invention. FIG. 9 is a schematic illustration of a passive seat belt system according to the fifth embodiment of this invention. In FIG. 9, the viewer is seeing toward the right front seat from the interior of the passenger car. A guide rail 67 is provided almost linearly along the roof side of the passenger car and in the front-to-rear direction of the passenger car. Adjacent to the rear end of the guide rail 67, there is provided a locking device 60 for holding a runner 65 there. The locking device 60 is constructed of a bracket 61 mounted on the body of the passenger car, a locking member 62 attached swingably on the bracket, etc. as apparent from FIG. 10 which illustrates the details of the locking device 60.

On a force-transmitting member 70 adapted to move the runner 65 along the guide rail 67, there are fixedly provided a first stopper 63 at the front end of the member 70 and a second stopper 64 at a point somewhat apart rearwardly from the first stopper 63. Between the stoppers 63 and 64, a connecting member 73 coupled with a plate 65b of a runner 65 is held in such a way that the connecting member 73 is movable relative to the force-transmitting member 70. The force-transmitting member 70 extends along a guide 66 to a rear part of the passenger car and is connected to drive means 68 installed in the trunk room or the like. Between the drive means 68 and locking device 60, there is provided for example the emergency locking device 16 as illustrated in FIGS. 4(a) and 4(b).

When the door is opened to permit the getting-on or getting-off of the occupant, the force-transmitting member 70 is moved frontward by the drive means 68. Thus, the second stopper 64 is brought into contact with the upper end of the locking member 62 and is caused to move freely while causing the locking member 62 to swing counterclockwise (i.e., to disengage from a nose portion 71 of the runner 65) until the second stopper 64 is brought into abutment against the connecting member 73. Thereafter, the runner 65 moves frontward together with the force-transmitting member 70, thereby bringing the webbing into a position indicated by two-dot chain lines in FIG. 9.

When the occupant sits in the seat and closes the door on the other hand, the force-transmitting member 70 is moved in the opposite direction to what has been described above and causes the runner 65 to move rearward while holding the connecting member 73 in contact with the first stopper 63. Accordingly, the nose portion 71 of the runner 65 is brought into engagement with the locking member 62 so as to hold the runner 65 there (in other words, so as to make the runner 65 to assume the position indicated by solid lines in FIG. 9).

In the event of an emergency of the passenger car, the pawl is operated by the inertia-force sensing member in the emergency locking device 16 as described above with respect to the first embodiment of this invention. The pawl 18 is thus brought into engagement with the engagement window of the force-transmitting member 70 and restrains any further movement of the force-transmitting member 70. Accordingly, the runner 65 is held more completely in the position depicted in FIG. 10. Unless the emergency locking device 16 is provided, the force-transmitting member may be moved forward by the drive means automatically if the door is opened in the event of an emergency or the like or the harness of the drive means is short-circuited in such a way that the drive means rotates in the webbing-releasing direction. Then, the runner is guided forward automatically as mentioned above, thereby developing a possible danger that the occupant may not be protected effectively. Such an accident will not happen in the present embodiment because any movement of the force-transmitting member 70 is restrained without failure by means of such a pawl as depicted in FIGS. 4(a) and 4(b).

By the way, parts of the above embodiment may be changed. For example, the emergency locking device may be modified into such a structure as illustrated in FIGS. 6 or 7 and the force-transmitting member may be changed into such a structure as shown in FIG. 8.

The description has been limited only to emergency locking devices each of which is interposed between its corresponding drive means and guide rail. However, such an emergency locking device may be provided at the free end side of the force-transmitting member, which free end side extends rearwardly from the drive means.

Although the runner serves to guide the free end protion of the webbing in each of the above embodiments, the runner may guide a middle portion of the webbing.

Having now fully described the invention, it will be apparent to one of ordinary skill in the art that many changes and modifications can be made thereto without departing from the spirit or scope of the invention as set forth herein.

What is claimed is:

1. A passive seat belt system comprising:
   a guide rail provided on the body of a vehicle;
   a runner movable along the guide rail so as to guide a webbing between an occupant-restraining position and an occupant-releasing position;
   a force-transmitting member connected with the runner and driven along the length of the guide rail by drive means;
   an inertia-sensing member movable in response to changes in speed of the vehicle; and
   a pawl operable by the inertia-sensing member in the case of an emergency of the vehicle so that the pawl is brought into engagement with the force-transmitting member to restrain any further movement of the runner along the guide rail.

2. A passive seat belt system as claimed in claim 1, wherein the pawl is supported turnably on the body of the vehicle.

3. A passive seat belt system as claimed in claim 2, wherein the pawl has a counterweight portion and is supported at its center of gravity.

4. A passive seat belt system as claimed in claim 1, wherein the pawl is supported on the body of the vehicle slidably in the direction passing through the force-transmitting member.

5. A passive seat belt system as claimed in claim 1, wherein the pawl is normally urged in a direction, where the pawl is unable to engage with the force-transmitting member, by biasing means.

6. A passive seat belt system as claimed in claim 1, wherein the inertia-sensing member is held at a static position by biasing means.

7. A passive seat belt system as claimed in claim 1, wherein the force-transmitting member defines, therethrough, an engagement window which is engageable with the pawl.

8. A passive seat belt system as claimed in claim 7, wherein the pawl is supported, when operated, on the body of the vehicle at two points with the engagement window of the force-transmitting member being interposed therebetween, whereby to restrain any further movement of the force-transmitting member.

9. A passive seat belt system as claimed in claim 1, wherein the force-transmitting member is formed of a tape-like main body and teeth supported on the main body and having a bilaterally and symmetrically trapezoidal configuration when seen in a side view, and the teeth are engageable with the pawl.

10. A passive seat belt system comprising:
    a guide rail provided on the body of a vehicle;
    a runner movable along the guide rail so as to guide a webbing between an occupant-restraining position and an occupant-releasing position;
    a force-transmitting member connected with the runner and driven along the length of the guide rail by drive means;
    a locking device adapted to releasably lock the runner which has guided the webbing to the occupant-restraining position;

an inertia-sensing member movable in response to changes in speed of the vehicle; and a pawl operable by the inertia-sensing member in the case of an emergency of the vehicle so that the pawl is brought into engagement with the force-transmitting member to restrain any further movement of the runner along the guide rail.

11. A passive seat belt system comprising:

a guide rail provided on the body of a vehicle;

a runner movable along the guide rail so as to guide a webbing between an occupant-restraining position and an occupant-releasing position;

a force-transmitting member connected with the runner and driven along the length of the guide rail by drive means;

a locking device adapted to releasably hold the runner which has guided the webbing to the occupant-restraining position;

means for releasing the runner from the locking device in response to a movement of the force-transmitting member so that the webbing is guided to the occupant-releasing position;

an inertia-sensing member movable in response to changes in speed of the vehicle; and a pawl operable by the inertia-sensing member in the case of an emergency of the vehicle so that the pawl is brought into engagement with the force-transmitting member to restrain any further movement of the runner along the guide rail.

12. A passive seat belt system as claimed in claim 11, wherein the runner-releasing means comprises an element fixed on the force-transmitting member and means for coupling the element to the runner in such a way that the element is movable within a predetermined range relative to the runner, and a movement of the force-transmitting member first of all causes the element to move relative to the runner so as to release the runner from the locking device and then permits the runner to guide the webbing to the occupant-releasing position.

* * * * *